March 17, 1942.   M. C. WEAVER ET AL   2,276,530
TRIM STRIP
Filed May 17, 1940

Maxwell C. Weaver
Frank C. Skinner
INVENTORS

BY Zugelter and Zugelter
ATTORNEYS.

Patented Mar. 17, 1942

2,276,530

UNITED STATES PATENT OFFICE 2,276,530

TRIM STRIP

Maxwell C. Weaver, Cincinnati, Ohio, and Frank C. Skinner, Detroit, Mich., assignors to The Randall Company, Cincinnati, Ohio, a corporation of Ohio Application May 17, 1940, Serial No. 335,806

7 Claims. (Cl. 296—135)

This invention relates to a trim strip such as may be employed in the upholstery art for maintaining cover or finish material in place upon a frame or skeleton structure. The device of the invention is of the same character, in a general way, as the strip which forms the subject matter of U. S. Patent No. 2,146,438, issued February 7, 1939, to Oscar Olson, and is usable for the purposes and in the manner disclosed in said issued patent. Other uses, of course, may occur to the reader and are not to be excluded by reason of the present exemplification of the invention with respect to usage in the automobile or vehicle upholstering art.

An object of the invention is to provide a trim strip of the character stated, which will possess the attribute of flexibility such as to enable it to readily conform with curved or irregular surfaces upon which it may be applied.

Another object is to facilitate and simplify the application of trim stripping, especially as used upon the curved surfaces encountered in the application of head linings and the like to the interior of vehicle roofs, or other locations, where puckering or uneven tensioning of the lining cannot be tolerated but must be smooth and taut relative to the underlying skeleton structure.

Another object of the invention is to provide a trim strip having ample gripping power upon a lining sheet, but which has its barbs so arranged, relative to a certain protective bead, as to preclude a cutting action of the barb edges upon the lining material between adjacent barbs.

A further object is to provide a trim strip having the advantages stated, but which may be manufactured as quickly and as inexpensively as most of the less effective strips known to the art.

The foregoing and other objects are attained by the means described herein and disclosed in the accompanying drawing, in which.

Figure 1:
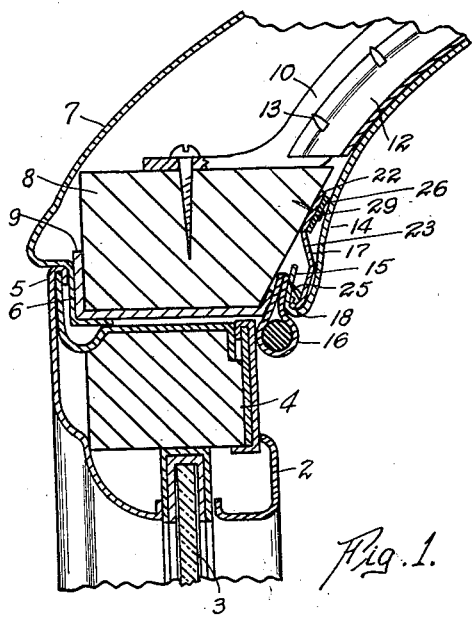
Fig. 1 is a fragmental cross section taken through an automobile door and adjacent roof portion of the body, showing application of the trim strip of the present invention thereto.

With reference to Fig. 1 of the accompanying drawing, there is shown a vehicle body having a door 2 provided with the usual window glass 3. In some instances, as in that shown, the door may include a wooden frame part 4. The outside flange 5 of the door may form a seal against an adjacent portion 6 of the vehicle roof 7.

The roof of the vehicle may be of ordinary construction, which in the present instance includes a roof rail 8 sheathed with a metallic strip 9, and adapted to support a roof bow 10 that spans the roof from one side of the vehicle to the other. Listing strips 12 may be held to the bow by means of prongs 13 struck from the material of the bow, and the head lining 14 is adapted to be supported by the listing strip in any suitable manner, such as by the use of tacks, adhesive, or other fastening means which will suffice for the purpose. As the present invention is not concerned with the attachment of the head lining to the bows, it will be unnecessary to explain in detail that procedure, which is well known anyway. The problem with which the present invention is concerned, is that of securing the head lining edges, such as 15. The character 16 indicates merely a so-called windhose, which may be tacked or otherwise secured along the door opening in accordance with common practice.

It will be noted that the raw edge 15 of the head lining fabric requires anchorage along the roof rail 8, adjacent to the windhose 16, and the anchorage must be such as will maintain a taut condition of the lining without the presence of wrinkles or other unsightly irregularities, notwithstanding the complex roof curvatures of the present-day pressed steel turret tops furnished on most vehicles. To accomplish the requisite smoothness and perfection of fitting of the head lining is one of the objects of the present invention, a detailed explanation of which follows.

The attaching of the head lining edges in accordance with this invention, involves the use of a head lining strip, or trim strip, which is indicated generally by the reference character 17 in all views of the accompanying drawing. Said strip is constituted of a continuous length of sheet metal rolled along one of its edges to form a flange or bead 18 which is semi-circular, or substantially so, to overhang a portion of the strip. This flange or bead provides protection against cutting or chafing of the head liner material 14 which extends over it, and performs other functions as will be explained hereafter.

Figure 5:
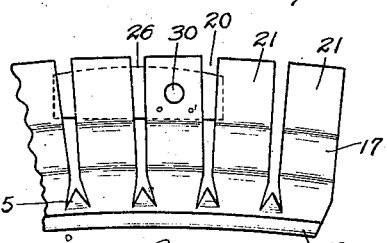
Fig. 5 is a view similar to Fig. 2, showing how the strip may be curved within its plane, for application to a curved surface line.

From the opposite edge 19 of the strip, slots 20 are cut toward the beaded edge 18 at intervals, providing a series of individual wings or plates 21 which have their inner ends integral with the beaded edge. The slots extend substantially to the beginning of the bead, so that it is possible to bend the strip or curve it longitudinally as illustrated by Fig. 5, thereby fanning out the free ends of the wings or plates 21 as the bead curves or assumes a concaved outer edge formation. In addition to curving in the manner just stated, the strip and its bead will lend themselves also to curving transversely of the strip, as well as longitudinally. Thus, the strip may be formed to fit any curved surface of the vehicle top where the head lining requires anchoring.

Figure 4:
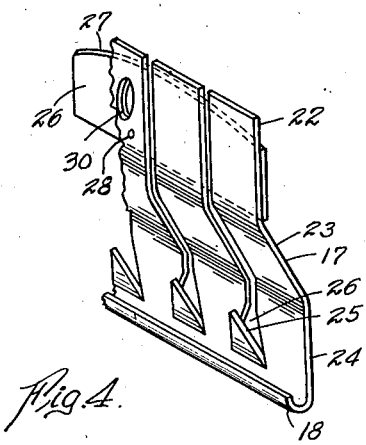
Fig. 4 is a fragmental perspective view of the same.
Figure 3:
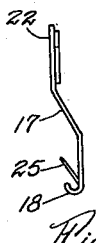
Fig. 3 is an end view of the trim strip illustrated by Fig. 2.

It should be noted that the wings or plates 21 are not flat, but each is bent with a reverse curve as in Figs. 3 and 4, to provide a mounting base portion 22, an inclined extension 23 on the base, and an offset part 24 which is in effect one leg of the bead 18. The part 24 may be termed the barb section of the strip, since from it the barbs 25 are struck.

The barbs 25 are formed by punching triangular enlargements 26 in the barb section 24, at the inner termini of the slots 20, with the bases of the barbs close to and parallel with a line at which the bead has its beginning. The barbs extend approximately in parallelism with the inclined extensions 23 of the wings, with the points of the barbs projected in the general direction of the shorter leg of the bead (Fig. 3). The points of the barbs may closely approach an extension of the plane of the base portions 22. It is important that the bases of the barbs be quite close to the bead in all instances, for reasons to be explained.

In order that the slotted edge of the strip may accommodate itself to the bending action illustrated by Fig. 5, and yet possess a somewhat connected relationship of its wings to provide sufficient rigidly for effecting a secure attachment to the roof rail, a series of alignment plates or guides 26 is utilized. Said plates or guides 26 are of flat metal, and each is adapted to span several wings, here shown as four. The plates may have curved upper or outer edges 27, so that no corners will be exposed beyond the ends of the wings when the head liner strip is curved to an extent greater than is indicated at Fig. 5. Each alignment or guide plate 26 is to be secured to one only of the wings which it spans, and for this purpose use may be made of spot-welds 28, or equivalent attaching means. The plates maintain generally a coplanar relationship of the wing bases 22, even though the strip be attached to the roof rail 8 by fixing thereto only a few of the bases. Where the nails or screws 29 pass through a wing base, both the base and the alignment plate are apertured as at 30. The aperture 30 preferably is formed in that wing which is fast to the alignment plate which backs it, for best results.

Referring now to Fig. 1, it will be noted that the barb section of the strip is spaced from the roof rail by reason of the angularity of the inclined section 23, and the barbs project upwardly and toward the rail. The pointed barb ends may actually contact the rail, or the windhose 16, if desired, as the wings of the strip are sufficiently resilient to allow for slight displacement of the prongs away from the rail when the head lining end 15 is forced up between the rail and the prongs by means of a blade or spatula as explained in the Olson patent previously referred to.

Particular attention is directed to the fact that the tension on the head lining sheet will always tend to advance the anchored edge of the sheet toward the bases of the barbs, and thereby enlarge the slits in the sheet produced by the barbs; however, the overhanging relationship of the smooth rounded bead to the barb bases, precludes such tendency and maintains the lining sheet edge at an elevation upon each barb. Accordingly, there is furnished no opportunity for the barbs to gradually enlarge the slits in the head lining until the ends of the slits would eventually meet and sever the anchored end from the body of the lining. This has been a fault common to head lining strips which depend upon serrations in an edge of the strip. Serrations are bound to have sharp edges, and will eventually cut the anchor end of the lining sheet completely away from the body thereof. The head lining strip of the present invention is free of that fault, and moreover, its holding function is therefore more lasting and secure for maintaining a taut condition of the head lining sheet.

The fact that the bases of the wings are reduced in extent by reason of the cutting away of the barb section at the various locations 26, in forming the barbs, results in facilitating the bending or curving of the head lining strip as required. By increasing or decreasing the width of the barb bases to any extent desired or necessary in view of the thickness or stiffness of the metal constituting the strip, bendability of the strip may be controlled in the manufacturing process. It may be observed also that the head lining strip of the invention may be curved in the reverse direction, opposite to that indicated by Fig. 5, when necessary, thereby resulting in a slight overlapping of the wings along their side edges.

The guides or plates 26 may be of any convenient length and thickness for lending rigidity to the attaching base portion of the strip and preserving a coplanar relationship of the wing bases by reason of their spanning function. The smooth rounded bead 18 as related to the prongs or barbs in accordance with the present invention, performs the very important office of precluding creeping of the head lining material along the barbs toward the barb bases, and thereby prevents severance of the marginal edge of the lining material from the main body portion thereof by the cutting action of the side edges of the barbs. The advantages of this over the serrated edge type of strip should readily be obvious upon examination of Fig. 6 of the Olson patent aforesaid, wherein the sharp edges of the serrations will be seen to form a continuous cutting element for material that may be impaled thereon to the maximum depth of the serrations, either during application of the material or during long usage accompanied by dampness and dryness which expands and shrinks the head lining material countless times in the lifetime of the vehicle.

Figure 6:
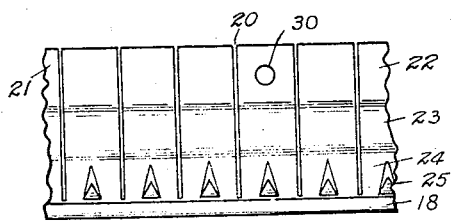
Fig. 6 is a fragmental plan view of a modification.

In the modified form of the device illustrated by Fig. 6, it will be seen that the slits 20 extend between adjacent barbs, instead of being in direct alignment therewith. By preference, the slits have their inner ends terminating substantially on a line with the bases of the barbs, and where the curve begins to form the bead. As in the other forms of the device, the base of each barb should be close to the beginning of the bead, in order that the bead will readily respond to a bending force applied in shaping the trim strip for use. If desired, the wings of the Fig. 6 device may be associated with guide plates like 26 of Fig. 2, or such guide plates may be omitted as previously pointed out. Apertures such as 30 may be formed in selected ones of the independent wings, for reception of nails, screws, or other fastening devices employed in mounting the strip.

Figure 2:
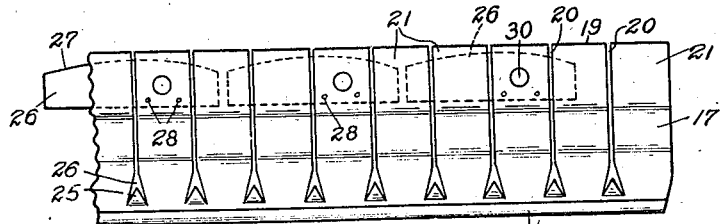
Fig. 2 is a plan view of the trim strip of the invention, part of its length being broken away.

In conclusion, attention is directed particularly to the fact that the invention, in its broadest form, should be considered as embodying a strip like that illustrated by either of Figs. 2 or 6, without any slits 29. The various elements 22, 23, 24, 25 and 18, bearing the relationship disclosed herein, and without incorporating the slits 29 and plate 26, constitute the broad invention. Of course, when the strip is manufactured without cutting the slits 29 therein, any curvature of the strip that may be required would be established by means of dies which incorporate in them the desired curvature. In other words, the required curvature of the trim strip would not then be established by means of a bending operation applied subsequently to completion of the strip in its straight form. With the slits incorporated in the strip, however, the curving of the strip to fit the surface upon which it is to be mounted, can be performed any time after the strip has been manufactured and produced in line formation.

Objects and advantages in addition to those specifically mentioned herein will doubtless become manifest to persons skilled in the art to which the invention pertains, resulting in a recognition of the superiority of the instant head lining strip herein disclosed.

What is claimed is:

1. A strip of the class described, which comprises a length of metallic ribbon having opposed longitudinal edges, one of said edges being turned lengthwise upon itself to provide a bead having a free edge overhanging a portion of the strip, barbs struck from the material of the strip and having their bases located in the strip close to the bead but outside the limits of the latter, the barbs having points extending beyond the bead in the general direction of extension of the overhanging free edge thereof, and at an acute angle to the strip, a base portion formed along the edge of the strip opposite to the edge which carries the bead, said base portion being offset in a plane which overlies the major portion of all the barbs.

2. A strip of the class described, which comprises a length of metallic ribbon having opposed longitudinal edges, one of said edges being turned lengthwise upon itself to provide a bead having a free longitudinal edge overhanging a portion of the strip, barbs struck from the material of the strip and having their bases located in the strip close to the bead but outside the limits of the latter, the barbs having points extending beyond the bead in the general direction of extension of the overhanging free edge thereof, and at an acute angle to the strip, an inclined extension on the portion of the strip which carries the barbs, said extension being at an inclination in substantial parallelism with the planes of the barbs, and an attaching base portion on said inclined extension disposed at an obtuse angle thereto, in substantial parallelism with the barb-supporting portion of the strip, and at an elevation above the bead and the bases of the barbs.

3. A strip of the class described, which comprises a length of metallic ribbon having opposed longitudinal edges, one of said edges being slitted transversely at intervals toward the other longitudinal edge, a bead formed lengthwise along said other longitudinal edge, to overhang a portion of the strip, barbs struck from the material of the strip with their points in line with the slits, and extending beyond and in the general direction of extension of the overhanging edge of the bead closely adjacent thereto and at an acute angle to the strip, and guide means fixed upon the strip to maintain a coplanar relationship of the strip sections at opposite sides of the series of slits.

4. A flexible head lining strip which comprises a metallic ribbon having opposed longitudinal edges, one of said edges being slitted at intervals transversely of the strip with removal of a thin width of waste, said slits terminating in punched out enlargements a short distance from the unslitted edge of the strip, the punched out portions being formed into pointed barbs with the points in line with their respective slits and extending in the general direction of the slitted edge, and a bead rolled onto the unslitted edge close to the bases of the barbs, with a terminal edge of the bead extending in the general direction of extension of the barb points and substantially overhanging the barb bases and directed toward common outer faces of the barbs proper.

5. A flexible head lining strip which comprises a metallic ribbon having opposed longitudinal edges, one of said edges being slitted at intervals transversely of the strip with removal of a thin width of waste, said slits terminating in punched out enlargements a short distance from the unslitted edge of the strip, the punched out portions being formed into pointed barbs with the points in line with their respective slits and extending in the general direction of the slitted edge, and a bead rolled onto the unslitted edge close to the bases of the barbs, with a terminal edge of the bead substantially overhanging the barb bases and directed in the same general direction as the barb points, the individual sections formed between adjacent slits being of substantial S-shape to provide an offset mounting base portion on the free end of each said sections, and guide plates less in number than the individual sections, fixed to certain of said sections and spanning a plurality of adjacent sections without fixation thereto.

6. A flexible head lining strip which comprises a metallic ribbon having opposed longitudinal edges, one of said edges being slitted at intervals transversely of the strip with removal of a thin width of waste, said slits terminating in punched out enlargements a short distance from the unslitted edge of the strip, the punched out portions being formed into pointed barbs with the points in line with their respective slits and extending in the general direction of the slitted edge, and a bead rolled onto the unslitted edge close to but not including the bases of the barbs, with a terminal edge of the bead substantially overhanging the barb bases and directed in the same general direction as the barb points, the individual sections formed between adjacent slits being of substantial S-shape to provide an offset mounting base portion on the free end of each of said sections, and guide plates less in number than the individual sections, fixed to certain of said sections and spanning a plurality of adjacent sections without fixation thereto, the sections to which the guide plates are attached being perforated to receive fastening means for mounting the strip upon a support.

7. A strip of the class described, which comprises a length of metallic ribbon having opposed longitudinal edges, one of said edges being turned lengthwise upon itself to provide a bead having a terminal edge overhanging a portion of the strip, barbs struck from the material of the strip and having their bases located close to but outside the limits of the bead, the barbs having points extending beyond the bead at an acute angle to the strip, and in the general direction of the overhanging terminal edge of the bead, a base portion formed along the edge of the strip opposite to the edge which carries the bead, said base portion being offset in a plane which overlies the major portion of all the barbs, the strip being slitted transversely at intervals from the bead to the opposite edge of the strip, with the slits located between adjacent barbs.

MAXWELL C. WEAVER.
FRANK C. SKINNER.